Oct. 20, 1970     L. H. WEINAND     3,534,969
SEAL
Filed Sept. 27, 1966
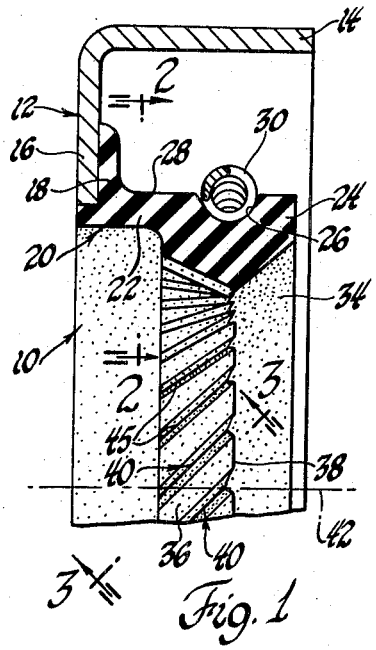
Fig. 1
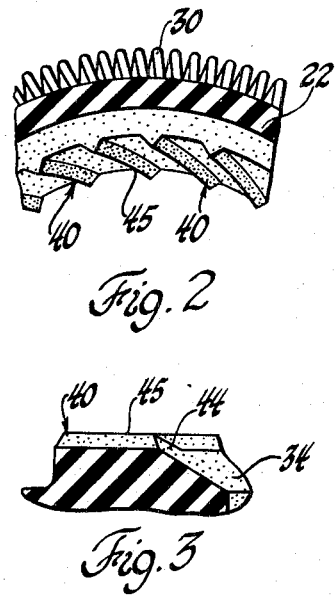
Fig. 2
Fig. 3
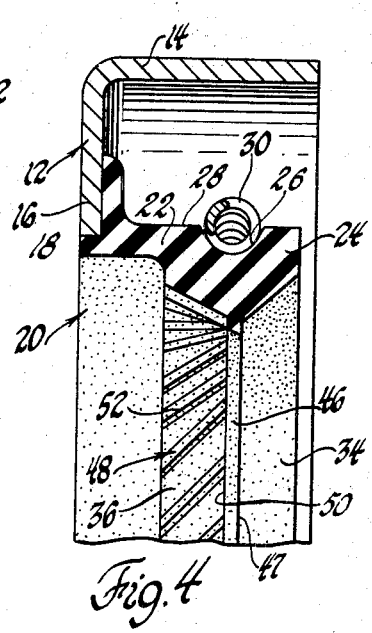
Fig. 4
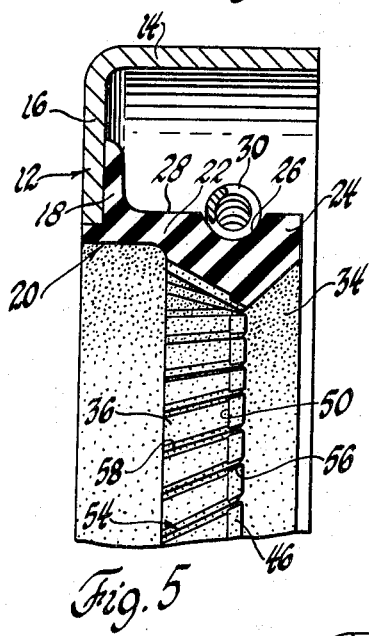
Fig. 5
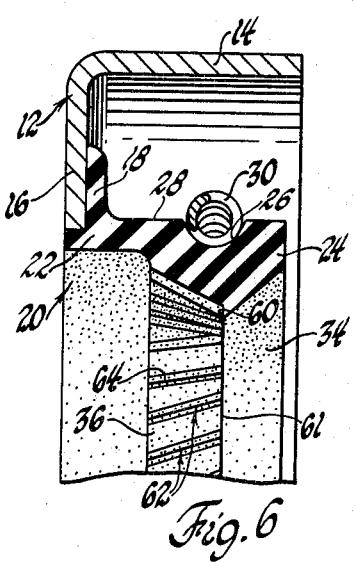
Fig. 6
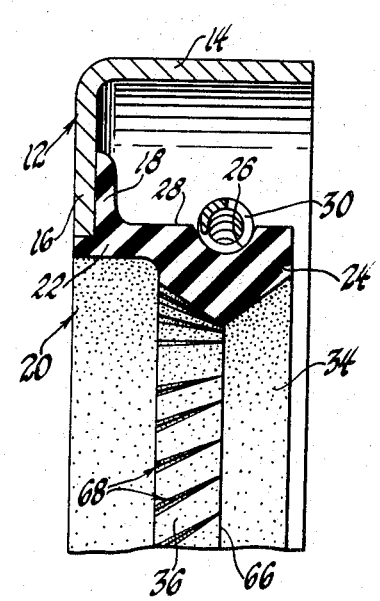
Fig. 7
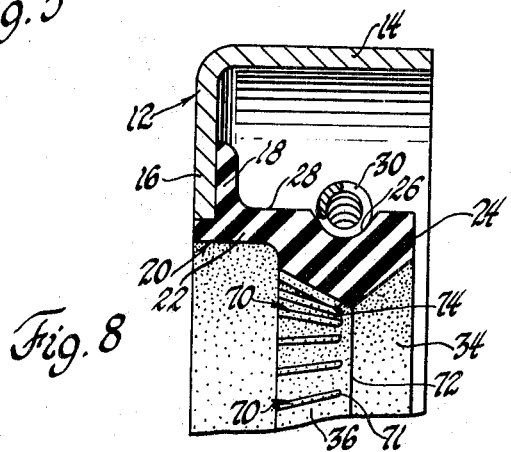
Fig. 8
INVENTOR.
Louis H. Weinand
BY
E. J. Bishop
ATTORNEY

United States Patent Office 3,534,969
Patented Oct. 20, 1970

3,534,969
SEAL
Louis H. Weinand, Warren, Mich., assignor to General Motors Corporation, Detroit, Mich., a corporation of Delaware
Filed Sept. 27, 1966, Ser. No. 582,368
Int. Cl. F16j 15/54, 9/00
U.S. Cl. 277—1   3 Claims

ABSTRACT OF THE DISCLOSURE

A fluid seal for use in sealing between relatively rotating members under dynamic and static operating conditions wherein an elastomeric sealing annulus mounted on one of the members has a seal lip that sealingly engages the other member under static operating conditions. Under dynamic operating conditions, fluid is permitted to leak past the seal lip. A plurality of helically disposed ribs are formed on a surface of the sealing annulus spaced from the fluid by the seal lip. A portion of the ribs contact the surface to be sealed adjacent the seal lip to form hydrodynamic pumping blades. When the members are relatively rotated, the pumping blades develop a hydrodynamic force that returns the fluid leaking past the seal lip to the fluid reservoir thereby preventing fluid leakage under dynamic operating conditions.

---

This invention relates to fluid seals and more particularly to a lip-type seal incorporating hydrodynamic sealing means for achieving a seal between relatively rotatable members.

A conventional radial lip seal is formed with an elastomeric body having a flexible lip that interferingly engages a shaft surface to be sealed. A seal of this type is capable of achieving an excellent static seal. However, the problems associated with the design of a radial lip seal become magnified when one demands that the shaft rotate relative to the seal. What makes a radial lip seal leak or fail under dynamic operating conditions is not completely understood, but it is known that the wear rate of such a seal is directly proportional to the pressure applied to the sealing lip. Lip pressures are therefore selected as low as possible to prolong the life of the seal, but unfortunately there is a limit to how low the pressure may be reduced. Too low a pressure results in leaking seals since the seal lip cannot follow the shaft surface as it rotates and a standing gap is formed at the seal-shaft interface permitting the fluid to escape.

The seal made in accordance with this invention is designed to achieve leak-proof sealing under dynamic operating conditions while permitting the use of lower lip pressures than conventional radial lip seals. This objective achieved by not having the seal lip maintain the usual pressure under dynamic conditions but have it exert only that amount of pressure required to ensure static sealing. Thus, the radial lip is purposely permitted to leak during dynamic operation to extend the life of its sealing surface. The fluid flowing past the lip is returned to the fluid reservoir by the action of a hydrodynamic seal comprised of a series of helically disposed ribs spaced about the inner circumference of the seal adjacent the static seal lip. With the seal assembled on the shaft, deformation of the resilient seal body against the shaft forces each helical rib into contact with the shaft surface over a portion of its length adjacent the static seal lip thus forming miniature helically disposed blades that cooperate with the shaft surface to develop a hydrodynamic pressure during shaft rotation. The hydrodynamic pressure counteracts the leakage force of the fluid passing beneath the lip and establishes a balance of forces so that dynamic leakage of the fluid is prevented.

One feature of this invention is that it provides a fluid seal having a number of helical ribs formed about the circumference of the sealing surface which provide a hydrodynamic sealing force under dynamic sealing conditions to counteract the leakage force of the fluid being sealed.

Another feature of this invention is that it provides a fluid seal including a seal body of resilient material having a static seal lip and radially divergent seal walls on either side thereof and wherein one of the angularly disposed walls has helical ribs thereon forming a hydrodynamic seal.

Yet another feature of this invention is that the helical ribs are intimately associated with the static seal lip and cooperate therewith to achieve good static sealing with minimum lip contact pressure and leak-proof dynamic sealing without excessive wearing contact between seal and shaft.

These as well as other features of this invention will be apparent to one skilled in the art upon an examination of the following detailed description of preferred embodiments of the seal of this invention taken in connection with the accompanying drawing wherein:

FIG. 1 is a partial, longitudinal section of a seal according to this invention;

FIG. 2 is a view taken generally along the line 2—2 of FIG. 1;

FIG. 3 is a view taken generally along the line 3—3 of FIG. 1;

FIGS. 4, 5, 6, 7, and 8 are sectional views of modified forms of the seal shown in FIG. 1.

Referring to FIG. 1, an oil seal 10 is shown comprising a generally L-shaped metallic annular casing 12 having an axially extending outer arm 14 adapted to be sealingly seated against a shaft housing. A radially inwardly extending arm 16 is integrally formed with the arm 14 and is attached to the butt end 18 of an annular seal ring 20 formed of rubber or other similar elastomeric material exhibiting characteristics of resilience and durability suitable for the particular environmental conditions to which the seal will be exposed.

Seal ring 20 includes a flex section 22 of reduced cross section and an enlarged seal body 24 which is adapted to engage and seal the annular surface of a shaft received through the central opening of ring 20. Seal ring 20, when in an unflexed condition, extends axially in generally parallel relation to outer arm 14 of casing 12 and has a circumferential groove 26 formed in an outer surface 28 which accomodates a garter-type spring 30 for urging body 24 radially inwardly against the engaged shaft surface. The inner circumferential portion of body 24 is formed with converging frustoconical walls 34 and 36 which intersect each other to form a sharp static seal lip 38 extending about the inner circumference of body 24. The diameter of seal lip 38 is selected to be somewhat smaller than the diameter of the shaft with which the seal is intended to be used so that a small diametrical interference is established between shaft and seal, thereby resulting in a slight deformation of seal lip 38 and ensuring good contact with the shaft surface about the full circumference of the seal to establish a static seal between shaft and seal surfaces while the members are at rest.

In the embodiment of the seal shown in FIG. 1, a number of angularly disposed ribs 40 are molded or otherwise formed upon the surface of wall 36, which is preferably the atmospheric side of the seal. Ribs 40, which are shown as being V shaped and of uniform cross section, are evenly spaced around the inner circumference of the seal body and have the same helix angle, that is, the acute angle formed between a line extending lengthwise through the rib and the longitudinal axis 42 of the seal. As seen in FIGS. 1, 2, and 3, the ribs 40 extend across the axial length of wall 36 and terminate with inner ends 44 which lie in a cone generated by the wall 34. Thus, the ribs 40 intersect seal lip 38 and give the lip a serrated appearance when viewed from either side along axis 42.

When the seal 10 is mounted on a shaft, the serrated edge of seal lip 38 is compressed to form a continuous circular lip which provides a good static seal when the members are stationary. The amount of deformation of seal lip 38 required to assure a static seal is achieved by selection of the proper initial diametrical interference between the resilient sealing member and the shaft and also by selection of a spring 30 of specific compressive force. With the seal positioned on the shaft, the inner portions 45 of ribs 40 adjacent seal lip 38 are forced into contact with the shaft surface by the seal lip loads to form what may be described as a number of miniature blades encircling the shaft and helically disposed relative thereto. As the members rotate relative to each other these miniature blades act as hydrodynamic pumps and develop a positive pressure to counteract the leakage flow forces. Any fluid leaking past seal lip 38 during dynamic operation of the sealing arrangement is thus pumped back past seal lip 38 and returned to the fluid reservoir.

While it is theoretically possible to place helical ribs 40 on the inclined wall at either side of seal lip 38, it is preferred that they be placed on the wall located on the atmospheric side of the seal. By so doing, it is ensured that a supply of fluid will always be beneath the contact seal lip during dynamic operation to provide lubrication and prevent a dry running seal which causes excessive heat generation and results in rapid failure of the seal.

FIGS. 4 through 8 depict five modified seals according to this invention which differ from the seal of FIG. 1, and from each other, only in the manner in which the helical ribs and static seal lip are formed on the seal body innerface. In the seal descriptions which follows, portions of each seal corresponding to like portions of the seal of FIG. 1, will be referred to by the same numeral.

In the seal shown by FIG. 4, inclined walls 34 and 36 of seal body 24 are interconnected by a radial inwardly projecting static seal lip 46 which extends about the inner circumference of the seal body and has an axial thickness as distinguished from the sharp seal lip of FIG. 1. The contact surface of seal lip 46 is preferably formed at the same acute angle as face 36 and is bordered at one side by a radially extending vertical wall 47 which is annular when viewed along the seal axis. Helical ribs 48 on the wall 36 are the same in cross sectional shape as the ribs 40 in the seal of FIG. 1. The ribs 48 are integrally joined to a wall 50 located on the other side of the aforesaid contact surface on the atmospheric side of static seal lip 46 and extend the axial length of the wall 36. The height of ribs 48 is such that the peak edges 52 are continuous with the contact surface of seal lip 46 and no portion of ribs 48 protrudes further radially inwardly than seal lip 46. As thus arranged, seal lip 46 first contacts the shaft surface when the seal is assembled about the shaft and makes continuous contact thereabout to provide a static seal of the contained fluid. Short lengths of ribs 48 adjacent seal lip 46 are also forced into contact with the shaft surface through deformation of the resilient seal body 24 and form small wiping blades about the shaft circumference similar to and for the same purpose as those of the preceding embodiment.

The seal depicted in FIG. 5 is similar to that of FIG. 4 in that it also has angularly disposed walls 34 and 36 and a static seal lip 46, however, in this modification, V-shaped helical ribs 54 are extended to the wall 34. The depth of rib portion 56 formed on seal lip 46 is shallower than rib portion 58 extending axially outward from wall 50 of seal lip 46. This arrangement produces a serrated edge on seal lip 46 as viewed along the seal longitudinal axis similar to that of seal lip 38 of FIG. 1. However, rib portions 56 protruding from seal lip 46 are much smaller in size than rib inner ends 44 forming a part of seal lip 38 in the seal of FIG. 1, and therefore lower lip loads may be used for compressing the serrated edge to form a continuous static sealing lip. Rib portion 58 is continuous with portion 56 and is adapted to form a helix blade adjacent seal lip 46 which wipes the shaft surface as the shaft rotates beneath the seal, pumping fluid leaking beneath lip 46 back to the fluid reservoir as in the previously described seals.

The modified seal of FIG. 6 includes a seal body innerface formed of walls 34 and 36 and an interconnecting radially extending wall 60 which intersects wall 34 to form a sharp static seal lip 61. In this seal, the wall 36 is recessed behind seal lip 61 a distance equal to the depth of helical ribs 62 and the apex 64 of each rib joins seal lip 61 at its inner edge so that the seal lip presents an uninterrupted circular profile when viewed from the side of wall 34 along the seal axis 42. Ribs 62 are formed integrally with and blend into wall 60 on the atmospheric side of seal lip 61 and extend axially outward therefrom across wall 36. The sharp static seal lip 61 ensures good static sealing with minimum lip contact pressure and lengths of ribs 62 adjacent seal lip 61 contact the shaft surface to form helix blades cooperative therewith to provide dynamic sealing in the manner aforementioned.

In FIG. 7, the seal shown includes inner seal walls 34 and 36 which intersect to form a sharp static seal lip 66. Helical ribs 68 on wall 36 are molded at a lesser angle than that of wall 36 so that the ribs formed are conically shaped and taper along their length toward seal lip 66. The taper of ribs 68 may be such that the inner ends thereof blend into seal lip 66 to give the lip a clear circular appearance when viewed along the seal axis, or they may retain a small beaded tip at lip 66 which results in a static seal lip similar in appearance to that of FIG. 1. As in the previous modifications, seal lip 66 forms a good static seal with the shaft surface with minimum contact pressure and ribs 68 form small helically disposed blades about the shaft circumference to create a hydrodynamic pumping force during shaft rotation to repel fluid leaking past the seal lip.

In another modification of the seal, here illustrated by FIG. 8, the helical ribs 70 formed on face 36 do not extend across the entire length thereof. Thus, as seen in FIG. 8, the inner ends 71 of ribs 70 are spaced from sharp static seal lip 72 formed by the intersection of seal faces 34 and 36. The ribs 70 and lip 72 are positioned relative to each other, however, in a manner to permit contact of the inner portion of each rib with the shaft surface when the seal is installed on the shaft. For this purpose, and as viewed in FIG. 8, the inner end or edge 71 of each rib 70 is arranged horizontally opposite to seal lip 72, or in other words, rib edge 71 and the oppositely adjacent point on seal lip 72 lie in a common horizontal plane. Ribs 70 may, if desired, be extended along such a horizontal line to blend into lip 72. It will be obvious from this that both lip 72 and inner rib edges 71 engage the shaft surface simultaneously when the seal is assembled to the shaft and that each will be deformed thereby, lip 72 forming a static seal as previously described and the inner end portions of ribs 70 extending from edges 74 forming small wiping blades which function to prevent fluid leakage along the shaft surface under dynamic sealing conditions.

In each of the designs heretofore described, the contact approach angle, that is, the conical angle which seal wall 36 makes with the shaft axis or parallel shaft surface, is chosen to ensure that there will be good contact between the helical ribs and the shaft surface. The particular angle to be chosen will depend on several variables, including the seal design being used, the trim interference between shaft and seal, and the spring pressure. Generally speaking, the contact approach angle should be 25° or less to ensure good helix contact when using low trim interference (0.005 to 0.025 in.) seals. In successful sealing applications with normal shaft runouts and eccentricities, contact approach angles of between 15° and 25° have been used.

It has further been discovered that sealing effectiveness is increased with the use of relatively shallow ribs having a depth generally between 0.003 and 0.005 inch. However, rib depths of greater or lesser dimension may be satisfactorily employed if sealing conditions or the selected seal design warrant their use. Finally, it has been determined that the helix angle of the angularly disposed sealing ribs should be within a range of approximately 20° to 60° and preferably of 45° or less if maximum pumping capability is desired. The hand or direction of placement of the ribs on the seal surface will be in accordance with the direction of relative rotation between the shaft and seal.

While the sealing surface has been herein characterized as having helically arranged ribs thereon, it is evident that a groove exists between each pair of ribs and that the description could therefore be in terms of grooves and lands between adjacent pairs of grooves. Moreover, the ribs as they have been here denoted are relatively narrow in width as compared to their length and may be of a generally triangular transverse cross section as shown, for example, in FIG. 2, thus presenting a sharp contact edge for engagement with the shaft surface, or may be of various other cross sectional shapes such as semicircular, square, or rectangular. Similarly the ribs need not extend across the full axial length of the seal wall 36 for it is evident that, while some wear of the seal body in contact with the shaft surface may be expected during the service life of the seal, the seal will never be worn down to an extent where the outer portion of the ribs furthermost removed from the seal lip contact the shaft. The ribs should be designed to be of sufficient length to ensure that some lengthwise portion thereof is always in contact with the shaft. It is also to be understood that the ribs may be of other shapes than those particularly described in the illustrative embodiments. Thus, for example, the ribs shown in FIG. 7 may taper in depth only as they approach the seal lip, while the rib width remains constant, or the ribs shown in any of the other figures may taper or otherwise vary in cross section along their length.

While preferred embodiments of the invention have been shown and described, it will be understood that various modifications may be made without departing from the scope of the invention as defined by the appended claims.

What is claimed is:

1. A method for creating a continuous and lubricated seal between a pair of relatively rotatable members during both rotation and nonrotation of said members so as to prevent a loss of fluid through the seal, one of said members being elastomeric and having a sealing surface and helically disposed elements formed thereon, said method comprising the steps of:
   (1) biasing said sealing surface on said one of said members into sealing engagement with a surface on the other of said members with force sufficient to prevent fluid flow between said surfaces during said nonrotation of said members;
   (2) biasing said sealing surface on said one of said members toward said sealing engagement with said annular surface on said other of said members with force insufficient to prevent the formation of an uninterrupted fluid film between said surfaces during rotation of said members;
   (3) generating hydrodynamic forces with said helically disposed elements during rotation of said members;
   (4) directing said hydrodynamic forces against said fluid film in a direction opposite to the direction of said loss of fluid; and
   (5) maintaining the generation of said hydrodynamic forces during said rotation of said members in a direction acting on said fluid film,
whereby said surfaces are continuously lubricated by said fluid film over their entire surface sealing areas during said rotation to extend the useful life of said sealing surface.

2. A method of achieving leakproof sealing of fluid under static and dynamic operating conditions between an annular elastomeric sealing member having helically disposed elements adjacent a seal lip and an annular relatively rotatable member having a surface to be sealed while operating at a low engagement pressure between said members, said method comprising the steps of:
   (1) exerting only that amount of engagement pressure between said seal lip and said surface to be sealed required to prevent leakage under said static operating conditions;
   (2) limiting said amount of engagement pressure to a level which permits fluid leakage under dynamic operating conditions whereby fluid flows between and past the seal lip under said dynamic operating conditions to provide dynamic lubrication of said seal lip to thereby reduce the heat generation between said members and extend the life of said seal lip;
   (3) generating hydrodynamic forces during dynamic operating conditions by means of said helically disposed elements;
   (4) directing said hydrodynamic forces against the fluid flow past the seal lip and in a direction counteracting said leakage; and
   (5) maintaining said hydrodynamic forces under dynamic operating conditions to establish a balance of forces to provide said lubrication of said seal lip, thereby achieving said dynamic leakproof sealing and reducing wearing contact between said members.

3. A method of low lip pressure sealing between a lip type seal having an annular sealing surface and a relatively rotatable shaft wherein one side of said lip type seal is exposed to fluid in a reservoir and the other side of said lip type seal formed with helically disposed element and is exposed to atmosphere, said method comprising the steps of:
   (1) biasing said sealing surface radially inwardly toward sealing engagement with said shaft and maintaining the lip pressure of said sealing surface on said shaft at a level sufficient to prevent fluid flow between said reservoir and said other side of said lip type seal under static operating conditions;
   (2) biasing said sealing surface radially toward said shaft with lip pressure insufficient to prevent leakage of fluid past said sealing surface under dynamic operating conditions whereby fluid flows between said sealing surface and said shaft to said other side of said lip type seal;
   (3) urging portions of said helically disposed elements into cooperation with said shaft to thereby develop hydrodynamic forces;
   (4) directing said forces against the fluid flow between said sealing surface and said shaft in a direction toward said reservoir; and
   (5) maintaining the hydrodynamic forces to create a balance of forces at said sealing surface,
whereby said sealing surface is continuously lubricated by said fluid to prevent excessive heat generation and the lower lip presure ensures leakproof dynamic sealing without excessive wearing contact between the seal and the shaft resulting in an increase in the useful life of said sealing surface.

References Cited

UNITED STATES PATENTS

| | | | |
|---|---|---|---|
| 2,188,857 | 1/1940 | Chievitz | 277—134 X |
| 3,259,393 | 7/1966 | Dega | 277—134 |

(Other references on following page)

| | | | | | |
|---|---|---|---|---|---|
| 2,446,380 | 8/1948 | Meyers et al. _____ 277—134 X | 1,101,074 | 3/1961 | Germany. |
| 3,214,179 | 10/1965 | Dega _____ 277—1 | 1,153,578 | 8/1963 | Germany. |
| 3,376,045 | 4/1968 | Jagger _____ 277—134 | | | |

FOREIGN PATENTS

SAMUEL ROTHBERG, Primary Examiner

| | | |
|---|---|---|
| 1,227,078 | 2/1960 | France. |
| 1,294,041 | 4/1962 | France. |

U.S. Cl. X.R.

277—134